7473X
Fales & Brown.
Device for Careening Ships.
Patented Mar. 9, 1833.
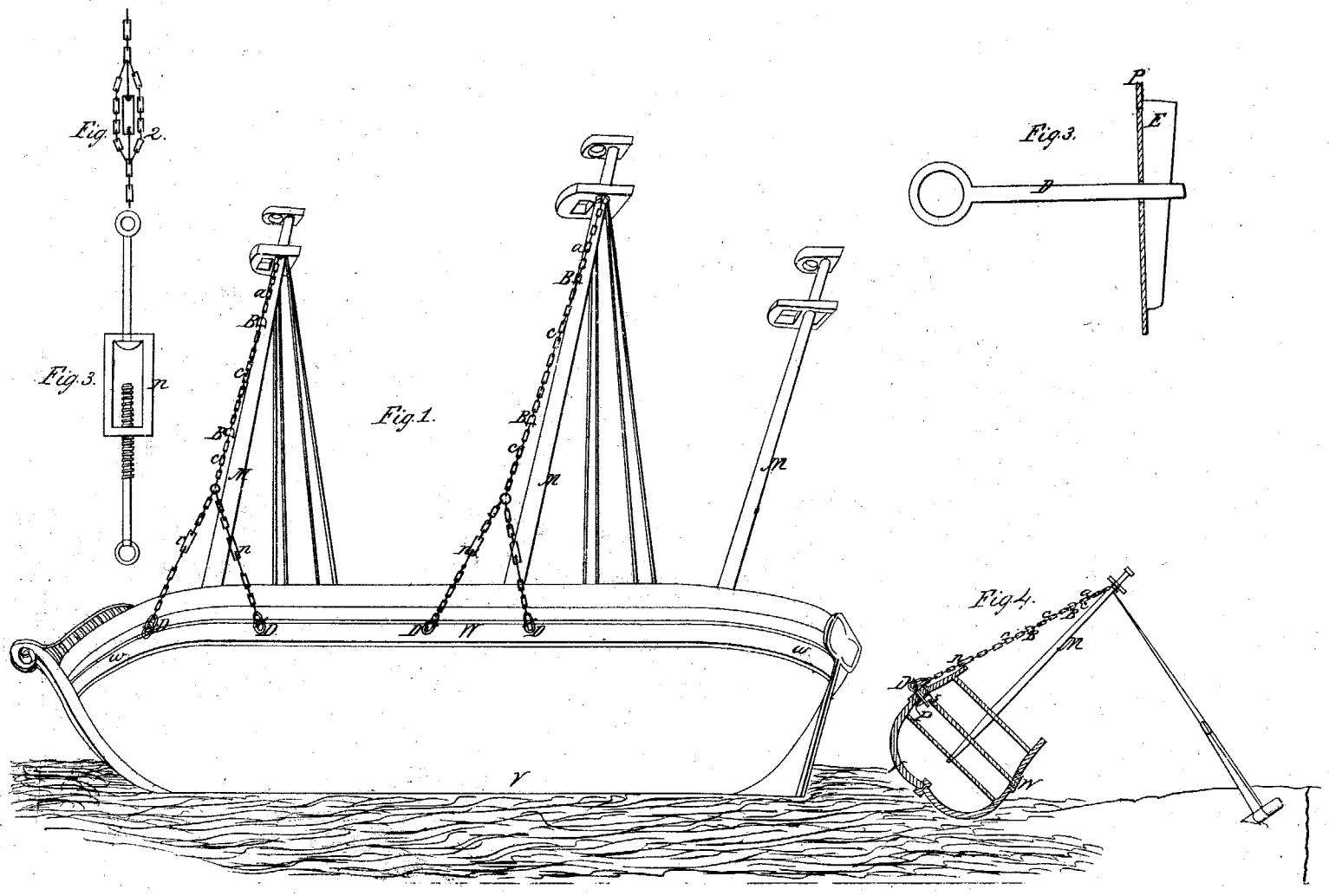
N. PETERS, PHOTO-LITHOGRAPHER, WASHINGTON, D. C

7473X

March 9. 1833

Letters Patent of James. Hales and Thomas D Brown, dated 9th March. 1833

---

The schedule referred to in these Letters Patent, and making part of the same, containing a description in the words of the said James Hales and Thomas D Brown themselves of their improvement in the machine for preventing accidents in Careening or Hauling down ships or Vessels. called "a Safety Chain"

---

Be it Known that we James. Hales & Thomas D Brown both of New Bedford in the County of Bristol and Commonwealth of Massachusetts Mechanics, have invented a method of preventing accidents in the careening or hauling down Ships or Vessels for the purpose of examining, repairing, or coppering their bottoms called "A. Safety Chain" which is described as follows to wit. -

Whereas in the common mode of careening ships for the aforesaid purposes, serious accidents sometimes occur by too great a strain upon the masts or shrouds of the vessel, we purpose to affix a chain to the top of the mast or masts by which the vessel is hauled down, to expose her bottom, which chain is to be connected with two nuts & screws to other chains to be fastened to the wales or sides of the vessel & by tightening the chain by means of the screw to relieve the strain on the masts or shrouds of the Vessel, occasioned by the force applied to the opposite side of the mast of the Vessel to force her side out of water. The application of these chains & screws may be better understood by reference to the drawing annexed & made part of this specification.

In the Drawing Fig 1st M. is the mast of the vessel, A, the portion of the chain affixed to the top of the mast B.B, shackles connecting different parts of the chain, c.c.c,c,c, different portions of the chain, N. N nuts thro' which the screw passes

[illegible]

passes D.D. bolts passing thro' the sides of the vessel & fastened by a key inside, to make fast the Chain to the walls, P.P. plates forming part of the bolts & spiked to the vessels side.
V. Bottom of the vessel to be drawn out & exposed, W.W.W. wales of the vessel. Fig 2 represents a stopper of which there are two to hook at each end to the chains on each side of the nuts, thro' which the screw passes in order to prevent the screw from slipping or breaking in case of too great a strain on it.

What we claim as our invention & wish to secure by Letters Patent is the application of a Chain or Chains of metal connected by a screw to the Masts & sides of vessels on the opposite side to that on which the force is applied in order to careen them or haul their bottoms out of water & thereby to prevent the accidents which occur in such operation, when none or an insufficient ~~force~~ counteracting force is applied.

James Sales
Thomas D. Brown

Witnesses
Green Catt
William Noyes